(12) United States Patent
Eckhoff et al.

(10) Patent No.: US 8,475,753 B2
(45) Date of Patent: Jul. 2, 2013

(54) EXHAUST-GAS AFTERTREATMENT SYSTEM WITH CATALYTICALLY ACTIVE WALL-FLOW FILTER WITH STORAGE FUNCTION UPSTREAM OF CATALYTIC CONVERTER WITH IDENTICAL STORAGE FUNCTION

(75) Inventors: Stephan Eckhoff, Alzenau (DE); Wilfried Mueller, Karben (DE); Joerg-Michael Richter, Frankfurt a. M. (DE); Stefan Franoschek, Nettetal (DE); Martin Votsmeier, Luetzelsachen Stadt Weinheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/392,362

(22) PCT Filed: Aug. 20, 2010

(86) PCT No.: PCT/EP2010/005109
§ 371 (c)(1),
(2), (4) Date: Feb. 24, 2012

(87) PCT Pub. No.: WO2011/023332
PCT Pub. Date: Mar. 3, 2011

(65) Prior Publication Data
US 2012/0148464 A1    Jun. 14, 2012

(30) Foreign Application Priority Data

Aug. 28, 2009    (DE) .................... 10 2009 039 249
Aug. 28, 2009    (DE) .................... 10 2009 039 250

(51) Int. Cl.
*B01D 53/94* (2006.01)
*F01N 3/10* (2006.01)
*F01N 3/28* (2006.01)
*G05B 1/00* (2006.01)

(52) U.S. Cl.
USPC .................. 423/213.2; 423/DIG. 5; 422/105; 60/276; 60/277; 60/299; 29/890

(58) Field of Classification Search
USPC ............. 423/213.2, DIG. 5; 422/105; 60/276, 60/277, 299; 29/890
See application file for complete search history.

(56) References Cited

U.S. PATENT DOCUMENTS

| 585,944 A | 7/1897 | Wilson |
| 4,961,917 A | 10/1990 | Byrne |

(Continued)

FOREIGN PATENT DOCUMENTS

| DE | 698 04 371 | 10/2002 |
| DE | 698 24 371 | 10/2004 |

(Continued)

OTHER PUBLICATIONS

B. Engler et al., "Catalytically Activated Diesel Particulate Traps—New Development and Applications", 1986, SAE860007, SAE Technical Paper Series, pp. 1-10.

(Continued)

*Primary Examiner* — Timothy Vanoy
(74) *Attorney, Agent, or Firm* — Smith, Gambrell & Russell, LLP

(57) ABSTRACT

The present invention relates to an exhaust-gas aftertreatment system which comprises a preferably catalytically active particle filter (wall-flow filter) which is followed in turn by a throughflow monolith (flow-through monolith) which is preferably provided with a catalytically active function. Both components have the same storage functions for gaseous substances present in the exhaust gas of internal combustion engines. The system is suitable in particular for the simultaneous removal of particles and pollutants from the exhaust gas of both predominantly lean-operated internal combustion engines and also of internal combustion engines operated predominantly with a stoichiometric air/fuel mixture. Likewise described is a process for the production and the use of such a system for exhaust-gas aftertreatment.

8 Claims, 3 Drawing Sheets

NOx, CO, HC, Particles

U.S. PATENT DOCUMENTS

Figure 1:
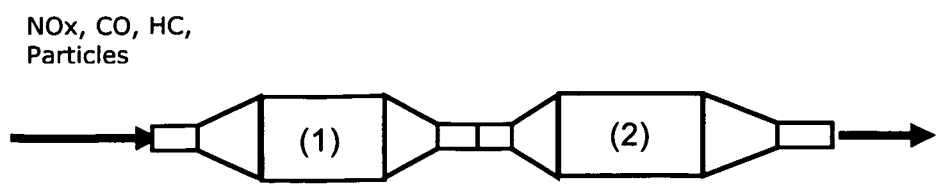

| | | | |
|---|---|---|---|
| 6,109,024 A | 8/2000 | Kinugasa et al. | |
| 6,338,831 B1 | 1/2002 | Strehlau et al. | |
| 6,387,338 B1 | 5/2002 | Anatoly et al. | |
| 6,468,941 B1 | 10/2002 | Bortun et al. | |
| 6,585,944 B1 | 7/2003 | Nunan et al. | |
| 6,602,820 B1 | 8/2003 | Göbel et al. | |
| 6,605,264 B2 | 8/2003 | Bortun et al. | |
| 6,655,129 B2 | 12/2003 | Lindner et al. | |
| 6,858,193 B2 | 2/2005 | Ruwisch et al. | |
| 7,041,622 B2 | 5/2006 | Nunan | |
| 7,051,521 B2 | 5/2006 | Funabashi | |
| 7,143,578 B2 | 12/2006 | Kakwani et al. | |
| 7,189,375 B2 | 3/2007 | Molinier et al. | |
| 7,229,597 B2 | 6/2007 | Patchett et al. | |
| 7,389,638 B2 | 6/2008 | Weissman et al. | |
| 7,490,464 B2 | 2/2009 | Li et al. | |
| 7,506,502 B2 | 3/2009 | Nakano et al. | |
| 7,767,175 B2 * | 8/2010 | Golden et al. | 423/213.2 |
| 7,799,298 B2 | 9/2010 | Pfeifer et al. | |
| 7,930,881 B2 | 4/2011 | Goersmann et al. | |
| 8,015,800 B2 | 9/2011 | Yoshida et al. | |
| 8,066,963 B2 | 11/2011 | Klingmann et al. | |
| 8,136,346 B2 | 3/2012 | Yoshida et al. | |
| 8,297,046 B2 * | 10/2012 | Bandl-Konrad et al. | 60/297 |
| 2002/0195173 A1 | 12/2002 | Bortun et al. | |
| 2003/0124037 A1 | 7/2003 | Voss et al. | |
| 2003/0180197 A1 | 9/2003 | Nunan | |
| 2004/0076565 A1 | 4/2004 | Gandhi et al. | |
| 2006/0010857 A1 | 1/2006 | Hu et al. | |
| 2006/0057046 A1 | 3/2006 | Punke et al. | |
| 2007/0089403 A1 | 4/2007 | Pfeifer et al. | |
| 2007/0269353 A1 | 11/2007 | Li et al. | |
| 2009/0062117 A1 | 3/2009 | Kluge et al. | |
| 2009/0093796 A1 | 4/2009 | Pfeffer et al. | |
| 2009/0151323 A1 | 6/2009 | Severin et al. | |
| 2009/0169451 A1 * | 7/2009 | Andreasson et al. | 423/213.2 |
| 2009/0193796 A1 | 8/2009 | Wei et al. | |
| 2010/0055012 A1 | 3/2010 | Grisstede et al. | |
| 2010/0233051 A1 | 9/2010 | Grisstede et al. | |
| 2010/0275579 A1 | 11/2010 | Klingmann et al. | |
| 2011/0000189 A1 | 1/2011 | Mussmann et al. | |
| 2011/0258993 A1 | 10/2011 | Goersmann et al. | |
| 2012/0034133 A1 | 2/2012 | Patchett et al. | |

FOREIGN PATENT DOCUMENTS

| | | |
|---|---|---|
| DE | 103 35 785 | 3/2005 |
| DE | 10 2006 025 050 | 11/2007 |
| DE | 10 2007 060 623 | 6/2009 |
| EP | 0 945 165 | 9/1999 |
| EP | 0 982 066 | 3/2000 |
| EP | 1 101 528 | 5/2001 |
| EP | 1 227 231 | 7/2002 |
| EP | 1 300 193 | 4/2003 |
| EP | 1 309 775 | 5/2003 |
| EP | 1 317 953 | 6/2003 |
| EP | 1 398 069 | 3/2004 |
| EP | 1 519 015 | 3/2005 |
| EP | 1 559 879 | 8/2005 |
| EP | 1 606 498 | 12/2005 |
| EP | 1 663 458 | 6/2006 |
| EP | 168 7514 | 8/2006 |
| EP | 1 837 497 | 9/2007 |
| EP | 1 843 016 | 10/2007 |
| EP | 1 904 721 | 4/2008 |
| EP | 1 911 506 | 4/2008 |
| EP | 1 959 120 | 8/2008 |
| EP | 2 042 225 | 4/2009 |
| EP | 2 042 226 | 4/2009 |
| KR | 10-2004-0042177 | 5/2004 |
| WO | 00/29726 | 5/2000 |
| WO | 02/26379 | 4/2002 |
| WO | 2004/076829 | 9/2004 |
| WO | 2005/047663 | 5/2005 |
| WO | 2005/092481 | 10/2005 |
| WO | 2005/113126 | 12/2005 |
| WO | 2007/008320 | 1/2007 |
| WO | 2007/137675 | 12/2007 |
| WO | 2008/106523 | 9/2008 |
| WO | 2008/121167 | 10/2008 |

OTHER PUBLICATIONS

Naoto Miyoshi et al., "Development of New Concept Three-Way Catalyst for Automotive Lean-Burn Engines", 1995, SAE950809, reprinted from Applications and Developments in New Engine Design and Components (SP-1071), pp. 121-130.

Autoabgaskatalysatoren, Grundlagen-Herstellung-Entwicklung-Recycling [Automobile exhaust-gas catalytic converters, principles—manufacturing—development—recycling], Ökologie, 2005, Expert Verlag, $2^{nd}$ edition, pp. 206-217 (with Concise Statement of Relevance in transmittal letter).

Martin Votsmeier et al., "Wall-flow filters with wall-integrated oxidation catalyst: A simulation study", Applied Catalysis B: Environmental 70, 2007, pp. 233-240.

International Search Report for PCT/EP2010/005109 mailed Nov. 18, 2010 (in English).

* cited by examiner

EXHAUST-GAS AFTERTREATMENT SYSTEM WITH CATALYTICALLY ACTIVE WALL-FLOW FILTER WITH STORAGE FUNCTION UPSTREAM OF CATALYTIC CONVERTER WITH IDENTICAL STORAGE FUNCTION

The present invention relates to an exhaust-gas aftertreatment system which comprises a preferably catalytically active particle filter (wall-flow filter) which is followed in turn by a throughflow monolith (flow-through monolith) which is preferably provided with a catalytically active function. Both components have the same storage functions for gaseous substances present in the exhaust gas of internal combustion engines. The system is suitable in particular for the simultaneous removal of particles and pollutants from the exhaust gas of both predominantly lean-operated internal combustion engines and also of internal combustion engines operated predominantly with a stoichiometric air/fuel mixture. Likewise described is a process for the production and the use of such a system for exhaust-gas aftertreatment.

The emissions contained in the exhaust gas of a motor vehicle can be divided into three groups. The expression "primary emissions" refers to harmful gases which are generated directly by the combustion process of the fuel in the engine and which are present in the so-called untreated exhaust gas at the cylinder outlet. The untreated exhaust gas of lean-burn engines comprises, in addition to the usual primary emissions of carbon monoxide (CO), hydrocarbons (HC) and nitrogen oxides ($NO_x$), a relatively high oxygen content of up to 15% by volume. There may also be particle emissions which comprise soot residues and possibly organic agglomerates and which result from a partially incomplete fuel combustion in the cylinder. "Secondary emissions" refers to harmful gases which can be generated as byproducts in the exhaust-gas purification system. A third group encompasses exhaust-gas components which are actively admixed to the exhaust gases in order for example to be able to effect a reaction with certain primary gases or secondary emissions across catalytic converter surfaces (DeNOx, SCR).

Exhaust gases of internal combustion engines operated with a predominantly stoichiometric air/fuel mixture are purified, in conventional processes, by means of three-way catalytic converters. These are capable of simultaneously converting the three significant gaseous pollutants of the engine, specifically hydrocarbons, carbon monoxide and nitrogen oxide, into non-harmful components. Aside from the gaseous pollutants of hydrocarbons (HC), carbon monoxide (CO) and nitrogen oxides ($NO_x$), the exhaust gas of gasoline engines also contains extremely fine particles (PM) which result from the incomplete combustion of the fuel and are composed substantially of soot.

On account of the potential health risk associated with respirable extremely small particles ("fine dust"), a limitation of the permitted particle emissions for gasoline engines has already been in place in Europe since 2009 with the introduction of the EU-5 exhaust gas standard. In addition to the existing particle mass limit value for diesel engines, an extension of the limit value by a more critical particle count limit value for diesel engines has already been agreed. For spark-ignition engines, said limit value is presently still under discussion. Therefore, compliance with legal exhaust-gas limit values for vehicles which will be applicable in Europe and probably also North America and Japan in future requires not only the removal of harmful gases, in particular nitrogen oxides, from the exhaust gas ("denitrogenization") but rather also an effective removal of particles.

The harmful gases carbon monoxide and hydrocarbons can relatively easily be made non-harmful from lean exhaust gas by oxidation on a suitable oxidation catalytic converter. Particle filters with and without an additional catalytically active coating are suitable apparatuses for removing the particle emissions. The reduction of the nitrogen oxides to form nitrogen is more difficult on account of the high oxygen content in the exhaust gas of lean-burn internal combustion engines. Known methods are based either on the use of nitrogen oxide storage catalytic converters (NOx storage catalyst, NSC) or are methods for selective catalytic reduction (SCR), usually by means of ammonia as a reducing agent, on a suitable catalytic converter, referred to for short as SCR catalytic converter. Combinations of these methods are also known in which, for example, ammonia is generated as a secondary emission on an upstream nitrogen oxide storage catalytic converter under rich operating conditions, which ammonia is initially stored in an SCR catalytic converter arranged downstream and is utilized in a subsequent lean operating phase to reduce the nitrogen oxides passing through the nitrogen oxide storage catalytic converter. DE 102007060623 describes numerous variants of prior art exhaust-gas purification systems with denitrogenization devices.

In the field of exhaust-gas aftertreatment of motor vehicles, use is made, preferably in diesel vehicles, of what are known as wall-flow filters to reduce the soot particles. Such filters may be used without a coating or with a catalytic coating. Catalytic coatings in the form of oxidation catalysts which can bring about an oxidation of hydrocarbons and CO, and possibly oxidize nitrogen monoxide (NO) to form nitrogen dioxide ($NO_2$), are conventional.

Future legislation necessitates, however, that all occurring harmful emissions such as particles, HC and CO and NOx be reduced as far as possible. To be able to utilize the installation space available in the vehicle for this purpose for the aftertreatment systems in the most optimum possible fashion, it will be necessary in future for the wall-flow filters which are used to be provided with further catalytic functions. Accordingly, there are already numerous further patent applications whose subject matter concerns particle filters with an oxidation-catalytically active coating and/or a coating which reduces the soot ignition temperature (Catalytically Activated Diesel Particular Traps, Engler et al., 1985, SAE850007). However, the coating of particle filters with other catalytically active materials is increasingly also being considered (EP1309775 for oxidation-catalytically coated filter; EP2042225, EP2042226, US 20090193796 for filter coated with TWC materials; EP1837497 or EP1398069 for filter coated with NOx storage catalysts; WO08106523 and EP1663458 for filter coated with SCR catalysts). In some applications, such as for example US 2006/0057046, allowance is also made for the exhaust-gas back pressure problems of filter substrates. Here, by means of special spatial arrangements of the catalytic coating, the most uniform possible flow of the exhaust gas through the filter walls is generated over the entire length of the component.

The applicant's EP1300193 describes a method for the catalytic conversion of pollutants in the exhaust gas of internal combustion engines, with the exhaust gas passing through a porous support body wall which is catalytically coated possibly at both sides and which has an open pore structure. Here, the support body itself may be composed of catalytically active material. A special embodiment of the method is suitable for the purification of the exhaust gases of stoichiometrically operated internal combustion engines. Here, a substrate is provided with a three-way catalyst coating (not specified in any more detail) which can simultaneously convert nitrogen oxides, hydrocarbons and carbon monoxide.

WO 00/29726 describes a device for the purification of diesel exhaust gases, in which a catalytically active filter is provided. The filter comprises a first catalytic converter which comprises a first platinum group metal and a first cerium compound. The device also comprises a second catalytic converter which comprises a second cerium compound. Embodiments are described in which both catalytic converters are arranged on the filter substrate. The system is characterized in that, by means of the cerium compound comprised in the second catalytic converter, the proportion of volatile organic constituents ("volatile organic fraction" VOF) which adheres to the soot particles in the diesel particle mass can be removed by oxidation. Therefore, in the particularly preferred embodiments, the second catalytic converter is arranged upstream of the catalytically active diesel particle filter.

In the catalytic coatings which are used, aside from the conventional catalytically active noble metals, materials which can filter out or adsorb certain components from the exhaust gas are playing an ever greater role. Said exhaust gas components may for example be: hydrocarbons, nitrogen oxides, ammonia, sulphur components and oxygen. Modern lean-burn engines (such as for example the diesel engine) will in future increasingly be equipped with NOx aftertreatment systems, with use being made here of SCR catalytic converters or NOx storage catalytic converters. SCR catalytic converters often have a storage function for ammonia, and NOx storage catalytic converters have a storage function for nitrogen oxides. In some applications, so-called sulphur traps are also required which can filter out or adsorb the sulphur from the exhaust gas in order to thereby prevent a deactivation of catalytic converters arranged downstream. For very stringent exhaust-gas regulations, it may also be necessary to utilize so-called hydrocarbon accumulators. Said accumulators can, at low exhaust-gas temperatures such as for example during a cold start, filter the unburned hydrocarbons out of the exhaust gas and desorb and convert said unburned hydrocarbons again at higher temperatures. For the exhaust-gas aftertreatment of spark-ignition engine exhaust gas, use is made of three-way catalytic converters which possibly have a storage function for oxygen.

In addition to the described catalytically coated particle traps, systems are also known which have a catalytically active particle trap and a further catalytic converter downstream thereof. The advantage of said arrangement is the fact that a plurality of catalytically active functionalities and the required particle removal can be accommodated in a space-saving manner in only two units. The majority of the known devices are again oxidative particle traps and/or particle traps provided with a soot ignition coating, which particle traps are followed by a unit which has a different catalytic function than the coating of the particle filter. There are for example numerous references in the literature to catalytically active diesel particle filters which are followed downstream by a nitrogen storage catalytic converter (NSC) (WO08121167, EP1606498, EP1559879, among others).

In all applications of storage systems, it is necessary for the respective storage function to be accommodated in the exhaust system in such a way that the storage medium can be utilized as completely as possible, as a result of which the catalytic converter volume can be kept small, which leads to a reduction in costs, a reduction in back pressure of the exhaust system and to an improved warm-up of the catalytic converters. The storage materials mentioned are embedded into the actual catalytically active functionality, as in the conventional concepts. The mode of operation of said storage materials is often such that, in a first phase, the storage of a component from the exhaust gas of the internal combustion engine takes place, for example during the storage of oxygen, nitrogen oxides or sulphur components, and when the storage capacity is reached, a different composition of the exhaust gas is initiated (in particular rich/lean change). The stored components are thereupon released and converted by the catalytically active functionality, in the vicinity thereof, into non-harmful exhaust gases. Furthermore—as already indicated—the stores are also used to enrich a certain exhaust-gas component in the catalytic converter and to enable said component to react with another exhaust-gas component, for example ammonia is stored in order to be able to react with nitrogen oxides. Some stores also serve merely to retain an exhaust-gas component until the catalytic converters arranged downstream have reached their working temperature, in order to discharge the components temporarily stored at low temperatures back to the exhaust gas again such that said components can then be converted by the downstream catalytic converters, such as is often the case for example in the case of hydrocarbons and nitrogen oxides.

According to their respective functionality, certain storage media (for example NSC, nitrogen oxide storage catalytic converters) must accordingly be emptied again from time to time in order that their functioning is not impaired. Other storage media must be filled in order that a catalytic function of the exhaust system can still be carried out successfully (for example $NH_3$ store in the SCR catalytic converter). For this purpose, use is made of different regulation systems which detect whether a storage medium is filled or empty. The detection of the filling level of a storage medium may take place by means of suitable sensors or by means of model calculations. To enable the most precise possible regulation, however, the breakthrough of an exhaust-gas component to be stored through the medium to be stored must ideally first take place when the store is virtually full. In this way, when a breakthrough of the component to be stored through the store is detected, the corresponding required step can be initiated immediately.

An important criteria for the operation of an exhaust system in the vehicle is the capability to monitor such a system continuously in the field with regard to the functionality of the catalytic converters. This "On Board Diagnosis" (OBD) prescribed by the legislator specifies that the vehicle has its own electronic systems for self-monitoring. The most recent regulations extend to monitoring of the monitoring. The basis is the fear that the diagnoses cannot be carried out regularly over the service life. It must therefore be recorded how often the diagnoses are carried out, and certain monitoring quotas are predefined.

To diagnose the efficiency of catalytic converters, sensors are positioned in the exhaust section downstream of the catalytic converters in order to check whether a storage function is still taking place with sufficient effectiveness. To monitor three-way catalytic converters, use is made for example of so-called lambda sensors which measure the oxygen content in the exhaust gas. A decrease in the oxygen storage efficiency of the three-way catalytic converter can be detected by means of the sensors and the engine controller, which decrease, in the event of an exceedance of a threshold value stored in the engine controller, can lead to an indication in the driver's display and possibly to a switch of the engine into an emergency running mode. In the future, the capability for clean diagnosis of the catalytic converters will become ever more important because the OBD threshold values will be set ever lower. A decisive feature for good monitoring capability is a clean, steeply rising or falling signal of the substances breaking through downstream of the catalytic converter if the corresponding store in the catalytic converter has been exhausted. In the case of a three-way catalyst applied to a wall-flow filter and with oxygen storage materials, the oxygen breakthrough takes place relatively early and with not a very steep gradient (FIG. 2), which considerably hinders the diagnostic capability. Furthermore, the measurement accuracy of the lambda sensors is subject to a drift over the service life of the vehicle, which in such a system further hinders the diagnosis of the diagnosis (monitoring of the function of the sensors).

As materials which exert a certain storage function in the catalytically active coatings, materials which are capable of storing the primarily or secondarily generated components nitrogen oxide ($NO_x$), ammonia ($NH_3$), sulphur components (such as hydrogen sulphide ($H_2S$) and sulphur oxides ($SO_x$)), oxygen ($O_2$) and hydrocarbons (HC) are of particular interest.

All in all, it is no longer conceivable to dispense with the use of such storage materials in modern exhaust-gas purification systems for internal combustion engines. With regard to the use of such materials in the combination of a filter followed by a catalytic converter, if appropriate with the same reactions being catalysed both on the filter substrate and also on the downstream catalytic converter and with the same storage materials being used on both units, reference is made to two applications from Toyota (EP1843016, EP1959120). Said applications mention in each case one particle filter which is arranged in the exhaust section of an internal combustion engine. The exhaust gases of the internal combustion engine are conducted across the particle filter. The particle filter is designed with a nitrogen oxide storage function and a nitrogen oxide reduction function. According to said disclosure, a filter prepared in this way is followed by a further flow-through catalytic converter, which is likewise designed with a nitrogen oxide storage function and a nitrogen oxide reduction function. Said arrangement is obviously proposed in order to be able to reduce the proportion of fuel for the regeneration of the individual catalytic converters together with that required for the combustion. However, nothing is reported regarding the effective utilization of the storage materials.

It was therefore an object of the present invention to specify an exhaust-gas aftertreatment system for exhaust gases of an internal combustion engine, which exhaust-gas aftertreatment system is superior to the systems of the prior art from an economical and/or ecological aspect. In particular, it is desirable for certain compounds present in the exhaust gas to be stored in the storage material which is used with optimum utilization of the storage capacity, in order to thereby provide said compounds in more sufficient amounts for a conversion required at a later time. At the same time, the structural conditions in the automobile should be allowed for. With regard to the OBD capability and regulability, the clearest possible signal detection is desirable.

Said objects and further objects emerging from the prior art are achieved by means of a system having the features of claim 1. Preferred embodiments emerge from the subclaims which refer back to claim 1. Claims 6 and 8 are aimed at a preferred use.

By providing an exhaust-gas aftertreatment system for internal combustion engines, having a wall-flow filter as component (1) and, downstream thereof, a flow-through monolith as component (2), in which both components (1) and (2) having at least one storage function for the same compound, selected from the group comprising SOx, NOx, $NH_3$, $O_2$, HC, $H_2S$, which is present in the exhaust gas, with the storage capacity in the component (2) to be designed such that the breakthrough signal downstream of component (2) has the highest gradient of the concentration curve resulting at the respective termination criterion taken into consideration for the exhaust-gas compound while as little as possible of the storage material is used, it is possible firstly for the structural size of the overall system to be kept within limits, since different functionalities (filtering of the particles and storage of the compounds mentioned which are present in the exhaust gas) are combined in an optimum manner. Secondly, the utilization of the storage materials which are used is assisted in the best possible manner as a result of the system layout according to the invention. This was not obvious to a person skilled in the art against the background of the known prior art.

Figure 2:
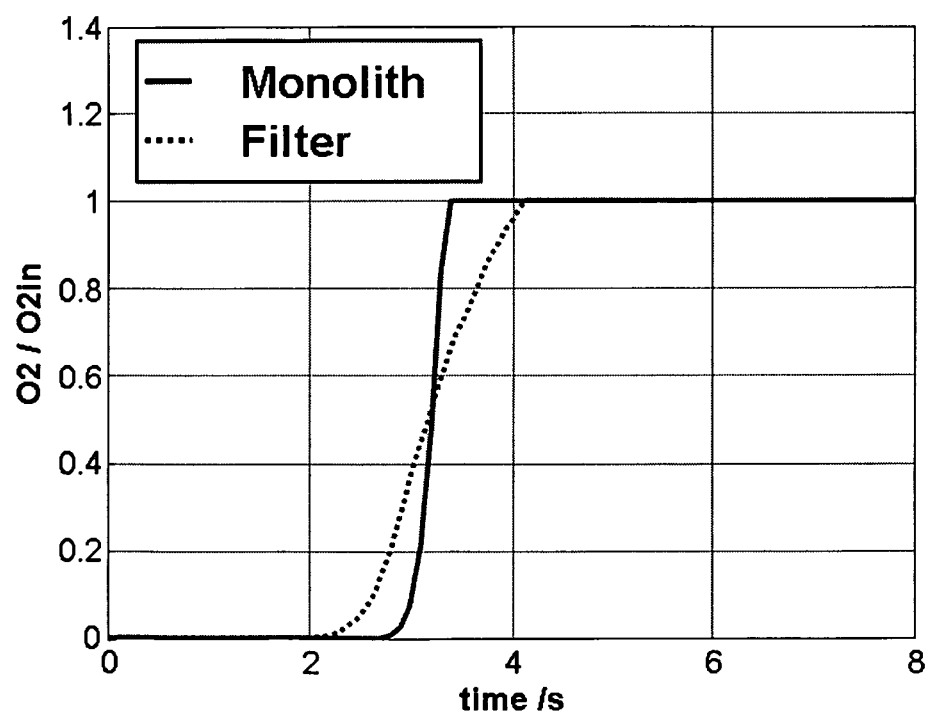

It has been observed that coated wall-flow filters which contain a storage material such as for example oxygen storage material (OSC) have different storage behaviour than coated flow-through monoliths. In dynamic storage tests, it was established that the storage material on the wall-flow filter usually cannot be completely utilized because the gas to be stored obviously passes through the filter too quickly without being completely adsorbed. This means that a breakthrough of the gas to be stored occurs more quickly than with a flow-through monolith coated with the same storage material, where a breakthrough of the medium to be stored first occurs when the storage medium is substantially filled (FIG. 2). The maximum available storage capacity of a wall flow filter containing storage material is therefore often utilized by only approximately 30-70%—depending on the design of the filter (for example volume, geometry, porosity, wall thickness, mean pore diameter and pore diameter distribution) and the adsorption dynamics of the storage medium. If the same amount of storage material is applied to a coated flow-through monolith, then 70-95% of the maximum storage capacity can be utilized in a real application.

Furthermore, the regulation of an exhaust-gas aftertreatment system is considerably more difficult in the case of a wall-flow filter coated with storage material than in the case of a through-flow monolith coated with storage material. In the case of a coated filter, breakthroughs of the components to be stored occur considerably more quickly. It is therefore necessary for a possibly required emptying/filling of the storage medium to be initiated very early by means of the regulating strategy. Under some circumstances, this requires additional fuel and/or increases in other pollutant emissions. Furthermore, the profile of the breakthrough signal of the component to be stored downstream of a filter containing storage material is different in that the rise in the concentration of the component to be adsorbed downstream of the filter rises less steeply than in the case of a monolith containing storage material. A slowly rising signal can however be detected by means of sensors only with difficulty, which additionally hinders the regulation of a system of said type.

Figure 3:
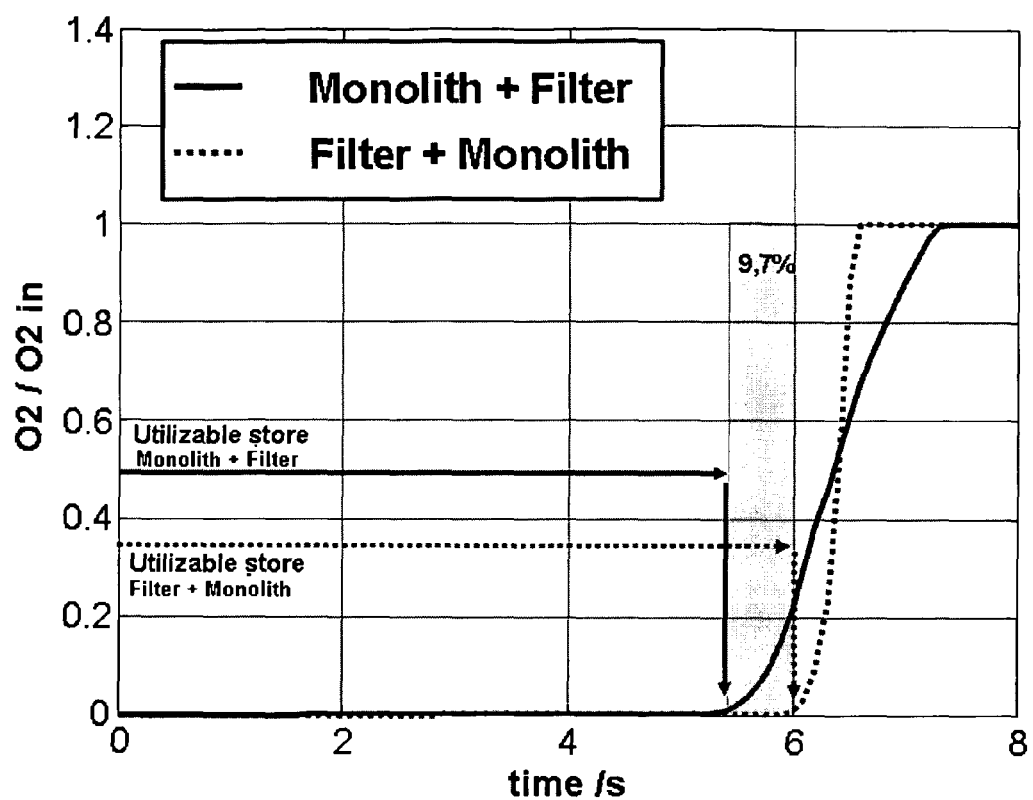

The respective storage material on a wall-flow filter can however be utilized more completely if a for example honeycomb-shaped flow-through monolith is connected downstream of the filter, which flow-through monolith likewise has a storage function for the same gas to be adsorbed. As a result of the fact that the downstream monolith intercepts the breakthrough through the coated filter of the gas to be adsorbed, the gas to be adsorbed is prevented from passing unhindered into the atmosphere. Furthermore, as a result of the lengthened adsorption phase, the storage medium in the filter is filled yet further and therefore, in the best case, is utilized by up to 100% until a breakthrough of the gas to be adsorbed takes place at the downstream flow-through monolith (FIG. 3).

Depending on the application, the wall-flow filter may be composed of different materials and may have different volumes, wall thicknesses, porosities and pore radius distributions. The possible quantities of catalytically active material and of the storage components which can additionally be accommodated on the filter accordingly vary significantly from application to application. Because the dynamic pressure across the filter can rise considerably with increasing proportion of catalytically active material, it is often expedient to keep the amount of storage materials on the filter relatively low in order to keep power losses of the engine resulting from an excessively high dynamic pressure of the exhaust system as low as possible.

Figure 4:
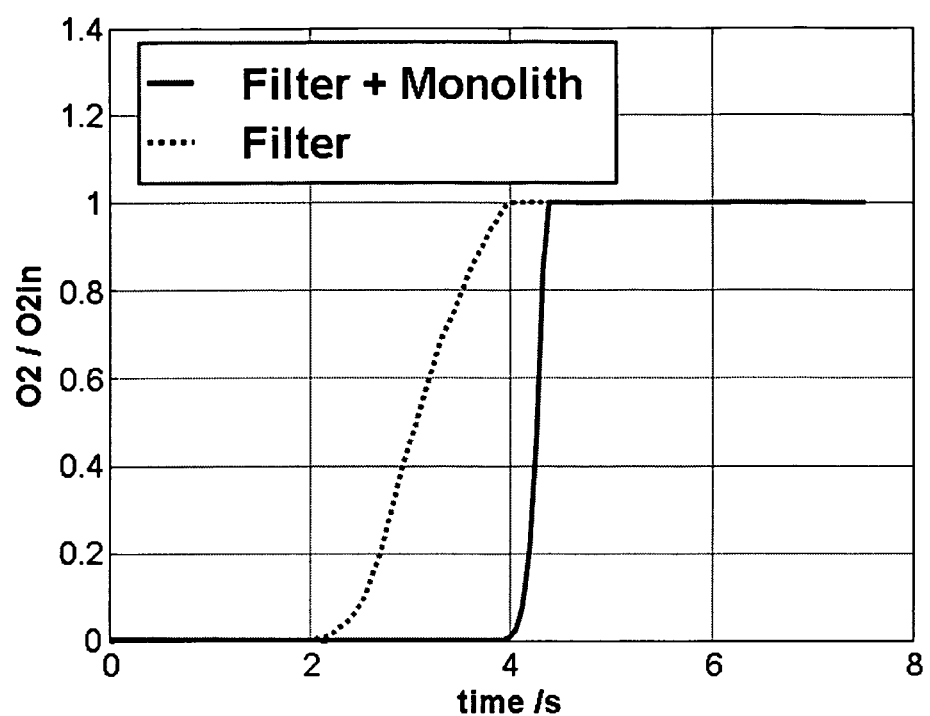

According to the present invention, it is proposed as a cost-effective solution that the flow-through monolith (2) have accommodated on it precisely such a storage capacity in the form of a corresponding material that the breakthrough signal downstream of the monolith has the highest gradient. That is to say the storage capacity of component (2) is configured such that the breakthrough signal downstream of component (2) has the highest gradient that can be attained with the corresponding monolith with the respective storage material. In the event of a further increase of the storage capacity on the monolith (2), a relatively steep rise in the breakthrough signal is then no longer obtained. In this regard, "highest gradient" is to be understood to mean the gradient of the breakthrough signal averaged over the entire range of the capacity of the storage material, which gradient should assume the greatest possible value. This is not to be understood as an absolute point value but rather may vary in the downward direction by up to 5%, preferably by up to 3% and particularly preferably by up to 2% of the value of the highest attainable gradient (error tolerance). FIG. 4 illustrates by way of example how the storage capacity of component (2) must be configured in order to utilize the entire store of component (1). Here, the entire breakthrough signal downstream of component (2) (solid line) is steeper than downstream of component (1) (dotted line) and has the highest gradient which can be obtained with component (2) and the given storage material. A further increase in the storage capacity would shift the breakthrough curve further to the right, approximately parallel to the illustrated breakthrough curve downstream of component (2), but without further increasing the gradient.

Advantageously, the storage capacity of component (2) has to be dimensioned to ensure an effective usage of the storage capacity of component (1) as well as having the best possible detector signal for the regulation of the system as well as for OBD purposes over all relevant operation points of the engine. It is especially preferred to design the storage capacity of component (2) for all operation points of the engine in the relevant test cycle for certification and the relevant OBD mapping matrix, respectively. This means that the storage capacity of component (2) has to be optimized for the worst-case engine operation point, where the efficiency of the storage of component (1) is lowest and the detector signal downstream component (2) shows the lowest slope, respectively to ensure the full usage of the storage capacity of component (1) and the best regulation of the system during all relevant operation modes of the engine.

With regard to the gases NOx, SOx, NH3, HC, $O_2$ and $H_2S$ to be stored, the storage capacity in the component (2) is to be designed such that the highest possible gradient of the concentration curve results at the respective termination criterion taken into consideration for the exhaust-gas component. The termination criterion for oxygen is, for example, the change in the lambda signal from lean to rich or from rich to lean at e.g. the lambda=1 point. For NOx, $NH_3$, SOx, $H_2S$ and HC it can be a measured concentration downstream component (2) or a correlated mass flow and cumulated mass, respectively. Depending on the sensor the related output signal might be a voltage or a current flow.

Depending on the legislation the termination criteria for NOx and HC can be a gas concentration in the ppm (parts per million) range or even up to several 100 ppm. For $NH_3$, SOx and $H_2S$ the termination criteria might be the correlated odor threshold limit when the gas is released to the environment.

Even a relatively small amount of storage capacity, and therefore if appropriate storage material on component (2), is sufficient for said design, since in the case of the gases considered here, a target value (for example concentrations in the exhaust gas) could be exceeded even after extremely small breakthroughs. Only up to said time is it necessary for the storage capacity of component (2) to then prevent the breakthrough of said gases, and therefore ensure the presence of a very steep and therefore easily detectable signal in contrast to the wall-flow filter (1) alone (FIG. 4). In said case, the focus of the invention is not so much on the optimum utilization of the present storage materials but rather on the improved regulability of the system on account of the steep signal, which contributes to more reliable compliance with the limit values being considered. Such a configuration of the storage material of component (2) would shift the breakthrough signal downstream of component (2) (solid line) shown in FIG. 4 further in the direction of the breakthrough signal downstream of component (1) (dotted line). If the target value were for example a concentration corresponding to 20% of the inlet concentration, then the storage capacity of component (2) would be configured such that the maximum gradient of the curve downstream of component (2) results at the value O2/O2 in of 0.2, which would be attained even with a very small amount of storage capacity on component (2). Beyond the value of O2/O2 in of 0.2, the breakthrough signal would accordingly run less steeply again because the breakthrough downstream of component (1) would also be followed directly by the breakthrough through component (2), since the storage capacity of component (2) would then already be exhausted.

The storage capacity, expressed for example as the amount of storage material on the monolith which is required to convert the shallowly-rising breakthrough signal through the filter completely into as steeply rising or falling a signal downstream of the monolith as possible, can be predicted only with difficulty. Depending on the design of the filter and of the storage material on the filter, the breakthrough signal downstream of the filter can vary considerably. It can generally be stated that the breakthrough signal of the medium to be adsorbed downstream of component (1) runs with a shallower gradient:

the higher the amount of storage material on the filter
the slower the storage kinetics of the component to be stored
the greater the porosity, the smaller the wall thickness and the wider the pore radius distribution of the filter material (increased probability of bypass formation—see further above)
the lower, in the case of asymmetrical inlet and outlet ducts, the ratio ($A_{out}/A_{in}$) of the cross-sectional areas between the outlet duct ($A_{out}$) and inlet duct ($A_{in}$).

Correspondingly, the storage capacity in the monolith (2) should be adapted by selecting the amount, the type of embedding into the washcoat and the type of storage material.

In an preferred embodiment, the storage materials used are the same compounds. Accordingly, both component (1) and component (2) have the same storage material. In this case, it has proven to be advantageous for the amount of storage material, or the corresponding storage capacity, in component (2) to be smaller than the corresponding amount of storage material of component (1). Particularly preferable is an arrangement in which the storage capacity of component (2) amounts to only approximately 20-70% of that of component (1). It is extremely preferable for the storage capacity of component (2) to be 30-50%. Said configuration of the system according to the invention is particularly preferable against the background that the spacing of the two components (1) and (2) to one another is less than 50 cm. If appropriate, the two components (1) and (2) may also abut against one another.

However, if a relatively large spacing of 70 cm or more is present between the two components (1) and (2), preferably 60 cm or more and particularly preferably 50 cm or more, or if further catalytic converters are installed between the two components, it may also be advantageous if the storage materials of components (1) and (2) for the same compound differ from one another. For example, it may be expedient if appropriate on account of different temperature requirements in components (1) and (2) to use storage materials which have different thermal stabilities or different temperature-dependent storage characteristics.

As a further alternative for setting the two above-specified conditions, a person skilled in the art may take into consideration different measures selected from the group comprising different support materials, differently produced washcoats, different amounts and/or ratios of noble metals, different types of storage materials for the production of components (1) and (2).

For the most optimum possible utilization of the storage functionalities, it is necessary for the same storage functionalities to be provided on components (1) and (2). It is a further preferred system according to the present invention in which both component (1) and component (2) have at least one catalytically active function. In a more preferred embodiment, it is likewise sought for both components to catalyse the same chemical reactions. Of particular interest are applications in which the same storage materials and the same catalytically active material are provided on component (1) and on component (2).

The system of the present invention may be produced from articles and in a manner known to those skilled in the art. However, the skilled worker should take care in that he provides an exhaust-gas aftertreatment system according to the present invention for internal combustion engines, having a wall-flow filter as component (1) and, downstream thereof, a flow-through monolith as component (2), in which both components (1) and (2) having at least one storage function for the same compound, selected from the group comprising SOx, NOx, $NH_3$, $O_2$, HC, $H_2S$, which is present in the exhaust gas, with the storage capacity in the component (2) to be designed such that the breakthrough signal downstream of component (2) has the highest gradient of the concentration curve resulting at the respective termination criterion taken into consideration for the exhaust-gas compound while as little as possible of the storage material is used, to earn all said positive aspects of this system. Needless to say that the preferred embodiments mentioned under the system part also apply for the process accordingly.

The subject matter of the present invention likewise encompasses the use of an exhaust-gas aftertreatment system of said type in a method for purifying exhaust gases of an internal combustion engine. Particularly advantageous is the use of the system according to the invention in such a form that a) the exhaust gases are conducted across component (1) and subsequently across component (2);
b) the measuring or modelling of the concentration of a compound, selected from the group comprising SOx, NOx, $NH_3$, $O_2$, HC, $H_2S$, which is present in the exhaust gas takes place downstream of component (2); and
c) a measure is initiated by the ECU (electronic control unit in the vehicle) when a stored target value is reached.

The concentration of the exhaust-gas components to be stored can be measured by means of corresponding sensors in the exhaust section. A modelling is carried out conventionally by means of the calculation of the loading of the storage materials by means of the mass flow of the exhaust-gas components which is stored in the engine characteristic map or calculated, with the calculated filling level of the storage material being aligned with the theoretical store which is stored in the storage material characteristic map. Here, a measure is initiated for example when the store has been filled to such an extent that a breakthrough of the component to be stored is imminent. This might happen for example when the lambda value of the exhaust gas is changed or when the exhaust mass flow is changed under dynamic driving conditions. Furthermore, a steep temperature increase could initiate a release of the stored gas (e.g. HC, $HN_3$ or NOx) from the storage material which can be also modelled. For the exact measurement of the temperature a thermocouple can be used which is placed upstream or downstream of component (2).

It is preferable if the stored target value is a value selected from the group comprising concentration, mass flow, cumulative mass, air/fuel ratio and lambda value.

As already indicated, the attainment of a steeply rising breakthrough signal is one of the significant objects of the present invention. A steeply rising breakthrough signal is an indication of as great as possible a concentration increase or weakening per unit of time (gradient of the concentration curve, FIG. 2). When a target value, determined as a function of the present system characteristics and as illustrated above, downstream of the component (2) is registered or calculated (modelled), a certain measure for changing the exhaust-gas flow is initiated by means of the ECU. The measure is self-evidently dependent on which compound from the exhaust gas is to be stored.

The measure initiated by the ECU may preferably be one or more selected from the group comprising: temperature variation, mass flow variation and/or concentration variation of the exhaust gas.

For example, if HC storage materials are used, in the event of an increased HC breakthrough downstream of the component (2), a temperature increase in the exhaust section could be initiated by means of engine-related measures or external heating in order that the stored hydrocarbons can be desorbed and converted by the catalytic converters.

Furthermore, if using a system with oxygen storage materials, in the event of a detection of an increase in the oxygen concentration in the exhaust gas downstream of the component (2), it would be possible to initiate a variation in the exhaust-gas composition which would result in an at least partial emptying of the oxygen store. Here, the oxygen concentration may be measured by means of known lambda sensors or oxygen sensors. In the case of measurement using lambda sensors, however, it is not directly the oxygen proportion in the exhaust gas that is measured but rather the air/fuel ratio and therefore an oxygen equivalent, which may likewise be taken into consideration for the initiation of the described measure. Depending on the lambda sensor, the signal is output in mV or as a lambda value. According to the invention, the value lambda (A) should be considered to be defined as a value describing the mixture composition composed of air and fuel. From the number, it is possible to draw conclusions regarding the combustion profile, temperatures, pollutant formation and efficiency. Other expressions are air ratio, air ratio number, air number, air excess and air excess number.

The combustion air ratio places the actual air mass $m_{L,act}$ available for a combustion in a ratio with respect to the minimum required stoichiometric air mass $m_{L,st}$ required for a complete combustion:

$$\lambda = \frac{m_{L,act}}{m_{L,st}}$$

If $\lambda=1$, then the ratio is a stoichometric combustion air ratio where $m_{L,act}=m_{L,st}$; this is the case if all the fuel molecules theoretically react completely with the air oxygen without there being a lack of oxygen and without there being any remaining unburned oxygen.

For Internal Combustion Engines:
$\lambda<1$ (z. B. 0.9) means "lack of air": rich mixture
$\lambda>1$ (z. B. 1.1) means "excess of air": lean mixture
Statement: $\lambda=1.1$ means that 10% more air participates in the combustion than would be required for a stoichometric reaction. This is simultaneously the excess of air.

If a system with $H_2S$ storage materials is used, then for example in the event of a detection of an increased $H_2S$ concentration downstream of component (2), the lambda$\leqq 1$ operation would be switched to an operating mode of the engine with lambda$\geqq 1$ in order to release $H_2S$ from the store and allow said $H_2S$ to be oxidized to form $SO_2$. The switch may take place for example by means of a switch of the combustion in the engine itself or by means of the injection of air into the exhaust section.

If an increased ammonia slippage is detected downstream of a monolith containing $NH_3$ storage materials, a temperature reduction in the exhaust section could be initiated, which would lead to an increased storage capacity of the storage material, as a result of which the ammonia slippage could be reduced. Furthermore, a reduction of the ammonia dosing could be carried out. It is clear that there are numerous options available to a person skilled in the art for correspondingly utilizing such a method.

The stored target value which initiates a measure by the ECU may be a concentration, a resulting mass flow or a cumulative quantity of the substance to be stored. For example, in the case of substances which cause an unpleasant odour, such as for example ammonia or hydrogen sulphide, it is expedient for a concentration or a mass flow to be stored as a target value in the engine controller, since it should be prevented that the odour threshold of the substance is reached as said substance emerges into the ambient air. A cumulative quantity as a predefined target value is particularly expedient when the aim is to comply with exhaust-gas regulations, such as is the case for example with hydrocarbon emissions.

As embodiments of the particle filter which is used according to the invention and which comprises a storage component as described above, it is possible to use any of the filter bodies composed of metal and/or ceramic materials as are conventional in the prior art. These include for example metallic fabric and knitted filter bodies, sintered metal bodies and foam structures composed of ceramic materials. Use is preferably made of porous wall-flow filter substrates composed of cordierite, silicone carbide or aluminium titanate. Said wall-flow filter substrates have inflow and outflow ducts, with in each case the outflow-side ends of the inflow ducts and the inflow-side ends of the outflow ducts being closed off, offset with respect to one another, with gas-tight "plugs".

Here, the exhaust gas to be purified, which flows through the filter substrate, is forced to pass through the porous wall between the inflow and outflow ducts, which results in an excellent particle filter action. The filtration property for particles can be configured by means of the porosity, pore/radius distribution and thickness of the wall. The storage material and possibly the catalyst material may be present in the form of coatings in and/or on the porous walls between the inflow and outflow ducts. It is also possible to use filters which are extruded directly, or with the aid of binding agents, from the corresponding storage and/or catalytic converter materials, that is to say the porous walls are composed directly of the catalytic converter, such as may be the case for example in the case of vanadium-based SCR catalytic converters.

Preferred filter substrates to be used may be gathered from EP1309775, EP2042225, US20090193796 or EP1663458.

Flow-through monoliths (component (2)) are catalytic converter supports which are conventional in the prior art and which, as in the case of the abovementioned filter materials, may be composed of metal or ceramic materials. Use is preferably made of fire-resistant ceramics such as for example cordierite. The flow-through monoliths composed of ceramic usually have a honeycomb-shaped structure composed of continuous ducts, for which reason flow-through monoliths are also referred to as duct-flow monoliths. The exhaust gas can flow through the ducts and, in so doing, comes into contact with the duct walls, which are coated with a catalytically active substance and possibly a storage material. The number of ducts per unit area is characterized by the cell density, which conventionally lies between 300 and 900 cells per square inch (cpsi). With ceramics, the wall thickness of the duct walls is between 0.5 and 0.05 mm.

NOx Stores:

Nitrogen oxides in the exhaust gas are composed, by definition, of nitrogen monoxide and nitrogen dioxide, with the nitrogen oxides being present approximately 50 to 90% as nitrogen monoxide in the exhaust gas of a lean-burn engine depending on the operating state of the engine. On account of the high oxygen content in the exhaust gas of lean-burn engines, the nitrogen oxides (NOx) produced during the combustion cannot be continuously reduced by means of three-way catalytic converters to form nitrogen with the simultaneous oxidation of hydrocarbons and carbon monoxide, as is the case in stoichiometrically operated spark-ignition engines. The catalytic reduction of said nitrogen oxides can take place only in a stoichiometric to rich exhaust-gas mixture. To be able to continuously reduce nitrogen oxides in lean exhaust gas, use is made of special catalytic converters, such as for example HC-DeNOx catalytic converters or SCR catalytic converters. A further possibility for the reduction of nitrogen oxides in lean exhaust gases is the use of nitrogen oxide storage catalytic converters.

In the lean, that is to say oxygen-rich atmosphere, in addition to the HC and CO components, the nitrogen oxides are oxidized under the catalytic action of the present noble metal in the NOx storage catalytic converter so as to form nitrates such as for example barium nitrate, are absorbed in the catalytic converter and are therefore removed from the exhaust-gas flow. If the holding capacity of the NOx storage catalytic converter is exhausted, then a rich, reducing exhaust-gas mixture is briefly set by the engine electronics (rich operation normally up to approximately ten seconds). As a result of the regular brief "enrichment", the reactions take place in the opposite direction, as a result of which the stored nitrogen oxides are discharged into the exhaust-gas flow again and are reduced, preferably to form nitrogen ($N_2$), by the reducing components such as HC—incompletely burned hydrocarbons—or CO which are present in the rich atmosphere. During this operating phase, the storage catalytic converter acts as a three-way catalytic converter. In this way, the catalytic converter is regenerated for the next storage cycle. By means of this process, it is also possible to minimize the pollutant emissions of economical lean-burn engines and to adhere to the legally prescribed emissions limits. The holding capacity of the nitrogen oxide storage catalytic converter may be monitored by means of a NOx sensor. The mode of operation of nitrogen oxide storage catalytic converters is described in detail in the SAE document SAE 950809. Corresponding NOx sensors may be gathered from the document Autoabgaskatalysatoren, Grundlagen—Herstellung—Entwicklung—Recycling [Automobile exhaust-gas catalytic converters, principles—manufacturing—development—recycling], Ökologie, 2005, Expert Verlag, $2^{nd}$ edition.

NOx storage catalytic converters are composed of materials which can remove nitrogen oxides from the exhaust-gas flow under lean exhaust-gas conditions and desorb and convert the nitrogen oxides under lambda=1 or rich exhaust-gas conditions.

The nitrogen oxide storage catalytic converters to be used here have therefore long been known to a person skilled in the art [EP0982066, EP1317953, WO2005/092481]. With regard to the design and the composition of nitrogen oxide storage catalytic converters (NSC), reference is also made to the statements in EP1911506 and EP1101528 and the literature cited therein. The corresponding catalytic converter materials are applied in the form of a coating together or separately from one another, using the methods known to a person skilled in the art, to monolithic, inert tetragonal or hexagonal honeycomb bodies composed of ceramic (for example cordierite) or metal. The honeycomb bodies have flow ducts, which are arranged in a dense grid over the cross section of said honeycomb bodies and which lie parallel to the longitudinal axis of the honeycomb bodies, for the exhaust gas to be purified. The catalytically active coating is deposited on the wall surfaces of the partitions which delimit the flow ducts in concentrations of 50 to 450 grams per liter (g/l) volume of the honeycomb bodies, preferably 200-400 g/l and very particularly preferably 250-350 g/l. The catalytic converter material contains the nitrogen oxide storage material and a catalytically active component. The nitrogen oxide storage material in turn is composed of the actual nitrogen oxide storage component, which is deposited in highly disperse form on a support material. As storage components, use is made predominantly of the basic oxides of the alkali metals, of the earth alkali metals, in particular barium oxide, and of the rare earth metals, in particular cerium oxide, which react with nitrogen dioxide to form the corresponding nitrates. Preferred storage materials are compounds containing Mg, Ba, Sr, La, Ce, Mn and K. As catalytically active components, use is conventionally made of the noble metals of the platinum group (for example Pt, Pd, Rh) which are generally deposited together with the storage component on the support material. As support material, use is made predominantly of active, large-surface-area aluminium oxide.

In the case of a wall-flow filter coated with NOx storage materials, both the storage and also the desorption/conversion function is utilized to an unsatisfactory extent in comparison with the coated monolith. In real driving operation, the lean-running times are shortened considerably, which can lead to increased fuel consumption and can adversely affect the drivability of the vehicle. Furthermore, an increased breakthrough of NOx through the filter during the lean phase can be expected, which considerably reduces the overall conversion of NOx across the filter. The modelling or measurement of the NOx storage filling level and the resulting termination of the lean phase takes place usually by calculation or by means of NOx sensors connected downstream of the filter. The termination of the rich phase initiated for the regeneration of the NOx storage material takes place usually by means of lambda sensors downstream of the filter. Since both the rich and also the lean phase are regulated by means of sensors in the case of a filter which is coated with NOx storage materials, an insufficiently pronounced breakthrough signal leads here to considerably reduced NOx conversion rates.

SOx Stores:

Nitrogen oxide storage catalytic converters are conventionally deactivated by sulphur compounds in the exhaust gas. Specifically, if the sulphur compounds generated in the combustion chamber of the engine impinge on the surface of the nitrogen oxide storage catalytic converter, then it is converted in a lean atmosphere initially to sulphur dioxide ($SO_2$) or sulphur trioxide ($SO_3$). The adsorption of the sulphur oxides may take place directly on the nitrogen oxide storage component or on the component which has an oxidizing action. Since the corresponding sulphate compounds which form in the nitrogen oxide storage catalytic converter are thermally highly stable and, in contrast to the corresponding nitrates, can be broken down only with difficulty, it is sought to minimize the $SO_x$ in the exhaust gas before it deactivates the nitrogen oxide storage catalytic converter. This is carried out firstly by minimizing the proportion of sulphur compounds in the fuel which is used and secondly by connecting special sulphur traps upstream of the actual nitrogen oxide storage catalytic converters (NSC).

In the field of exhaust-gas aftertreatment, sulphur traps are known which can remove both hydrogen sulphide and also sulphur oxides from the exhaust gas. As stated, these sulphur traps are preferably arranged upstream of NOx storage catalytic converters in the flow direction and are intended to prevent the sulphur components from being able to pass into the NOx storage catalytic converter and chemically deactivate the NOx storage centres. So-called sulphur traps have a high storage capacity for sulphur and must be able to virtually quantitatively adsorb the sulphur in order to prevent the deactivation of the downstream catalytic converters.

For example, EP1959120 and EP1843016 describe exhaust-gas aftertreatment systems in which a corresponding $SO_x$ trap is positioned upstream of a particle filter, with the latter having a nitrogen oxide storage catalytic converter (NSC) (see also EP1904721). A different strategy is followed in EP1911506 which, with regard to its disclosure relating to the teaching of the sulphur store being addressed, is regarded as being included in this application. Said document proposes the reduction of the basicity of the nitrogen oxide storage material which is used, inter alia by means of the addition of cerium oxide. In principle, the storage material for sulphur stores is however of the same design as that of the nitrogen oxide storage catalytic converters. Overviews of special sulphur storage materials may be gathered from the following documents: EP1843016, EP1959120, EP0945165.

$NH_3$ Store:

SCR catalytic converters are capable of causing nitrogen oxides to react with ammonia to form nitrogen under lean exhaust-gas conditions. SCR catalytic converters conventionally have a storage function for ammonia and contain zeolites, which may be exchanged with transition metals, or compounds containing vanadium or tungsten. An SCR catalytic converter is particularly active when its ammonia store is at least partially filled. The metering of ammonia into the exhaust section takes place conventionally by means of an external dosing device directly into the exhaust section upstream of the SCR catalytic converter. A slippage of ammonia as a result of an excess metering or an ammonia desorption as a result of a rapid temperature increase should as far as possible be prevented, since ammonia has an extremely pungent odour and should not, as a secondary or tertiary emission, pass untreated into the atmosphere. The wall-flow filter coated with an ammonia storage function self-evidently has a greater ammonia slippage than an identically designed flow-through monolith.

For example for exhaust-gas aftertreatment systems which have a nitrogen oxide storage catalytic converter followed by an SCR catalytic converter, it has proven to be expedient to design the SCR catalytic converter such that it is capable of storing a certain quantity of ammonia ($NH_3$). Such a configuration of exhaust-gas aftertreatment units has been described for example in EP1687514. In said systems, it is advantageous that the nitrogen oxide storage catalytic converter also produces a small amount of ammonia in the regeneration phase. If the SCR catalytic converter situated downstream has an $NH_3$ store, then the $NH_3$ produced can be stored in said $NH_3$ store and would then be available for the subsequent reduction of NO which has broken through the upstream nitrogen oxide storage catalytic converter.

Materials which have proven to be expedient for use for storing $NH_3$ are known to a person skilled in the art (US2006/0010857; WO2004076829). As storage materials for ammonia, use is made preferably of micro-porous solid materials, so-called molecular sieves. These may be zeolite-containing materials such as for example mordenite (MOR), Y-zeolites (FAU), ZSM-5 (MFI), ferrierite (FER), chabazite (CHA) and β-zeolites (BEA) and aluminium phosphates (AlPO) and silicone aluminium phosphate SAPO or mixtures thereof. These are preferably exchanged with transition metals, particularly preferably with iron, copper, cobalt or silver, and catalyse the SCR reactions of ammonia with nitrogen oxides. Use is particularly preferably made of ZSM-5 (MFI), chabazite (CHA), ferrierite (FER), SAPO-34 and β-zeolites (BEA), which are exchanged with iron and/or Cu. Use is very particularly preferably made of SAPO-34 or β-zeolites (BEA) exchanged with iron and/or copper. It is also possible to use vanadium compounds, cerium oxides, cerium/zirconium mixed oxides, titanium dioxide and tungsten-containing compounds and mixtures thereof as ammonia storage materials.

$H_2S$ Store:

Hydrogen sulphide is a gas which has an unpleasant odour in very low concentrations and which is highly toxic in relatively high concentrations. These secondary emissions must therefore be removed completely in the exhaust system of the vehicle. For this purpose, various so-called "$H_2S$ blocking catalytic converters", or exhaust-gas catalytic converters which are additionally equipped with a corresponding blocking function, have been proposed in the prior art.

Said hydrogen sulphide stores are arranged downstream of three-way catalytic converters or NOx storage catalytic converters in the flow direction and are intended to prevent hydrogen sulphide from passing untreated into the atmosphere. So-called hydrogen sulphide traps have a high storage capacity for hydrogen sulphide under rich exhaust-gas conditions and are capable, in a lean atmosphere, of desorbing the stored hydrogen sulphide and oxidizing said hydrogen sulphide to form sulphur oxides. Use is made here of catalytic converters which contain the transition metals of the subgroups I and II and of the subgroups VI-VIII of the Periodic Table of the Elements, preferably the elements Cu, Zn, Cr, Mn, Fe, Co, Ni, Ag, Pb, Pd, particularly preferably Ni, Mn, Fe, Cu. Said metals may be deposited on metal oxides such as for example on doped, large-surface-area aluminium oxides or mixed oxides or else may be used in conjunction with zeolites.

HC Store:

Further storage materials associated with exhaust-gas aftertreatment systems are storage materials for hydrocarbons (HC). Such materials are likewise familiar to a person skilled in the art (KR20040042177). Zeolite-containing materials are conventionally used for storing hydrocarbons. The hydrocarbons are adsorbed while the exhaust gas is cold (for example during a cold start) and are desorbed and converted when a higher exhaust-gas temperature is reached. The conversion of the hydrocarbons takes place mostly at catalytic centres, such as for example noble metals. It is therefore conventional to integrate hydrocarbon-storing materials into oxidation catalytic converters or three-way catalytic converters in order to store the hydrocarbons when the catalytically active centres are not yet active and to desorb said hydrocarbons when the catalytic centres have reached their light-off temperature. In this case, the hydrocarbon store would be integrated both into the filter and also into the downstream monolith, possibly together with a catalytic function.

As storage materials for hydrocarbons, use is made of micro-porous solids, so-called molecular sieves. Use is preferably made of zeolite-containing materials such as for example mordenite (MOR), Y-zeolites (FAU), ZSM-5 (MFI) and β-zeolites (BEA) or mixtures thereof. These are preferably used in H-form or NH4-form, though may also be exchanged with transition metals.

In certain cases, these may also be doped with noble metals such as Pt, Pd, Ru, Re, Ir and Rh. Use is particularly preferably made of ZSM-5 (MFI) and 3-zeolites (BEA).

$O_2$ Store:

Oxygen-containing materials have redox properties and can react with oxidizing components such as oxygen or nitrogen oxides in an oxidizing atmosphere and with reducing components such as hydrogen or carbon monoxide in a reducing atmosphere. Examples of oxygen-storing materials include cerium and praseodymium or corresponding mixed oxides which may additionally contain the following components selected from the group of zirconium, neodymium, yttrium and lanthanum. These oxygen-storing materials are often doped with noble metals such as Pd, Rh and/or Pt, whereby the storage capacity and storage characteristic can be modified.

EP1911506 describes the design of the exhaust-gas aftertreatment of an internal combustion engine which operates substantially in the stoichiometric range. Use is made there of a particle filter provided with an oxygen storage material. An oxygen-storing material of said type is advantageously composed of a cerium/zirconium mixed oxide. Further oxides of in particular rare earth metals may be present. Preferred embodiments of the particle filter according to the invention thus additionally contain lanthanum oxide or neodymium oxide. Use is most commonly made of cerium oxide which may be present both as $Ce_2O_3$ and as $CeO_2$. In this regard, reference is made to the disclosure of U.S. Pat. Nos. 6,605,264 and 6,468,941.

Such oxygen-storing materials are used preferably in so-called three-way catalytic converters. Three-way catalytic converters contain oxygen-storing materials which are usually composed of oxides of cerium and are possibly used with other metal oxides as thermally stable mixed phases (for example Ce/Zr mixed oxides). These are capable of removing oxygen from the exhaust gas under lean conditions and releasing said exhaust gas again under rich exhaust-gas conditions. In this way, it is prevented that, during the brief deviation of the fuel/air ratio from lambda=1 into the lean range, the NOx conversion across the TWC decreases and NOx breakthroughs occur. Furthermore, a filled oxygen store prevents the occurrence of HC and CO breakthroughs when the exhaust gas briefly passes into the rich range, since under rich exhaust-gas conditions, the stored oxygen firstly reacts with the excess HC and CO before a breakthrough occurs. In this case, the oxygen store serves as a buffer against fluctuations around lambda=1. A half-filled oxygen store has the best performance for intercepting brief deviations from lambda=1. To detect the filling level of the oxygen store during operation, use is made of lambda sensors. The determination of the filling level and utilization of the oxygen store is difficult if the storage material is accommodated on a wall-flow filter.

The oxygen storage capacity correlates with the ageing state of the entire three-way catalytic converter. Within the context of OBD (on-board diagnosis), the determination of the storage capacity serves for the detection of the present activity and therefore the ageing state of the catalytic converter. Furthermore, an only sluggishly rising breakthrough signal downstream of the filter makes the OBD of such a catalytic converter difficult.

For example, EP1227231 describes a method for operating a three-way catalytic converter which contains a minimum and a maximum filling level for oxygen and which is arranged in the exhaust section of an internal combustion engine, with the air/fuel mixture supplied to the engine being regulated in such a way that the filling level of the oxygen-storing component of the catalytic converter is kept in a middle nominal range between the minimum and maximum filling levels.

WO 02/26379 describes a method for reducing carbon monoxide, hydrocarbons and soot particles in the exhaust gas of lean-burn engines using a particle filter, with the soot particles having a soot ignition temperature TZ and with the particle filter being regenerated from time to time by increasing the temperature of the particle filter above the soot ignition temperature and burning off the soot particles. The particle filter which is used is provided with a catalytically active coating which, to reduce the ignition temperature of the soot, contains at least one oxygen-storing component and at least one of the platinum group metals of platinum, palladium and rhodium. In a preferred embodiment of the particle filter, the coating contains a second group of compounds which serves to oxidize carbon monoxide and hydrocarbons and contains at least one of the platinum group metals of platinum, palladium and rhodium supported on a support material selected from the group comprising aluminium oxide, silicone dioxide, titanium dioxide, zirconium oxide, zeolite or mixtures thereof. The two substance groups are arranged preferably in two separate layers situated one above the other, with the oxidation-catalytically active coating being applied directly to the inflow ducts of the filter substrate and with the coating which reduces the soot ignition temperature being arranged over said oxidation-catalytically active coating, such that the exhaust-gas to be purified comes into contact firstly with the coating which reduces the soot ignition temperature. The oxygen-storing materials described in the publications are advantageously materials which permit a change in their oxidation state. Further storage materials of said type are described for example in WO05113126, U.S. Pat. Nos. 6,387,338, 6,585,944, 7,041,622, EP2042225, and US20090193796.

The expression "coating" is to be understood to mean the application of catalytically active materials and/or storage components on a substantially inert support body which may be constructed in the manner of an above-described wall-flow filter or flow-through monolith. The coating performs the actual catalytic function and contains storage materials and/or catalytically active metals which are usually deposited in highly disperse form on temperature-stable, large-surface-area metal oxides. The coating is carried out usually by means of the application of an aqueous suspension of the storage materials and catalytically active components—also referred to as a washcoat—onto or into the wall of the inert support body. After the application of the suspension, the support is dried and if appropriate calcinated at elevated temperature. The coating may be composed of one layer or constructed from a plurality of layers which are applied to a support body one above the other (in multi-layer form) and/or offset with respect to one another (in zones).

Oxygen-containing materials are used usually in three-way catalytic converter formulations though may also be used in conjunction with oxidation catalytic converters and nitrogen oxide storage catalytic converters.

Hydrocarbon-containing materials are often used in oxidation catalytic converters which are used for the exhaust-gas purification of diesel engines. Applications are however also known in which hydrocarbon stores are used in conjunction with three-way catalytic converters in order to comply with particularly stringent exhaust-gas legislation.

Ammonia-storing materials are used preferably in SCR catalytic converters which catalyse a reaction of ammonia with nitrogen oxides to form nitrogen in a lean atmosphere.

Hydrogen-sulphide-storing materials are used preferably in conjunction with three-way catalytic converters though may also be used in catalytic converters which catalyse the SCR reaction. Such SCR catalytic converters are well known to a person skilled in the art (WO2007/137675, U.S. Pat. No. 4,961,917, DE10335785). SCR catalytic converters are to be understood to mean catalytic converters which, under lean exhaust-gas conditions, convert nitrogen oxides, with the addition of reducing agents such as for example ammonia, selectively to form nitrogen. Said catalytic converters contain acidic oxides and can store ammonia. Typical SCR catalytic converters contain for example vanadium oxide and/or tungsten oxide on titanium oxide. Alternatively, consideration is also given to zeolites which are used in H-form or which may be exchanged with metals such as copper and/or iron. Such catalytic converters conventionally contain no catalytically active platinum metals, since said metals would oxidize the ammonia to form nitrogen oxides in lean exhaust gas. For the exhaust-gas purification system according to the invention, use is preferably made of SCR catalytic converters which contain zeolites. Zeolites have a particularly large storage capacity for ammonia and for hydrocarbons. They are therefore excellently suited to the storage and conversion of said components of the exhaust gas with nitrogen oxides.

It should be noted that component (2) which is arranged downstream and which has a storage function need not be arranged directly downstream of component (1). It is also possible for other devices encountered in exhaust-gas after-treatment systems, selected from the group comprising sensors, injection devices, further catalytic converters, mixers, burners and heat exchangers, to be situated between component (1) and component (2).

Furthermore, the monolith (2) which is arranged downstream may also be arranged in the underbody region of the vehicle, and the filter (1) may be arranged close to the engine. Here, close to the engine means at a distance of less than approximately one meter away from the engine, and the underbody position lies over one meter away from the engine. Furthermore, further catalytic converters with other functions may also be situated between the two storage media. It may be expedient, for example in order to reduce the HC emissions during a cold start, for a further catalytic converter with an HC storage function to be situated between a filter coated with an oxygen storage function and a downstream three-way catalytic converter with an oxygen storage function. Furthermore, a filter provided with an ammonia storage capability may be followed directly by a NOx reduction catalytic converter without ammonia storage capability or an NO2 forming catalytic converter, which in turn is followed by a further catalytic converter with ammonia storage capability in order to further increase the nitrogen oxide conversion. Furthermore, an oxidation catalytic converter could be arranged between two HC storing components, which oxidation catalytic converter can oxidize a part of the hydrocarbons stored on the filter. It may for example be expedient for a filter which has a storage capacity for nitrogen oxides to be followed by an SCR catalytic converter with ammonia storage and NOx reduction functions, which in turn is followed downstream by a monolith with a NOx storage function. Such applications are known to a person skilled in the art (DE69824371, US2004076565).

It would likewise be possible for a catalytic function of said type, which was previously arranged on a separate catalytic converter between the filter and the monolith, to be applied as a coating to the outlet side of the filter (1) or to the inlet side of the downstream flow-through monolith (2).

In the prior art, numerous systems are known in which a reversed layout in relation to the system according to the invention described here is selected. That is to say a flow-through monolith provided with a corresponding storage function is situated upstream of the wall-flow filter which is provided with a corresponding storage function (for example US20090193796A1). However, said layout does not result in an improved utilization of the storage material on the coated filter (FIG. 3). Although the storage capacity of the entire system is likewise increased, the storage capacity of the coated wall-flow filter is not fully utilized. Furthermore, the Toyota company, for example, uses such systems in their commercially available DPNR system, in which a flow-through monolith coated with NOx storage material is connected upstream of a wall-flow filter coated with NOx storage material.

As already mentioned above, in the case of a coated filter, there is a significantly earlier breakthrough of the medium to be stored, and therefore an inadequate utilization of the storage material (FIG. 2). The problem is solved in that a further catalytic converter is concomitantly arranged downstream of the coated filter, which further catalytic converter has a storage function for the same medium as the filter. In this way, as shown in the example part, more of the component to be stored can be stored per storage process. Said component may then be made available more advantageously for subsequent reactions.

In the example part, it will be shown on the basis of model calculations that a system comprising a wall-flow filter coated with storage material and, arranged downstream thereof, a correspondingly coated flow-through monolith, which filter and monolith both have the same volume and have been coated with the same amount of oxygen storage material, can utilize the storage material more effectively than a similar system comprising a coated monolith with a filter arranged downstream. Furthermore, the breakthrough of the medium to be stored—in this example oxygen store—is significantly steeper, as a result of which a corresponding regulating strategy and monitoring strategy can be applied more easily. It should additionally be noted that both the volume and also the amount of the storage material on the monolith (2) positioned downstream of the filter (1) should be configured such that the storage material on the coated filter is utilized in the most optimum manner possible. As can be seen in the example part (FIG. 4), an approximately 60% smaller catalytic converter volume, or a correspondingly lower storage amount on the downstream monolith, would be sufficient to be able to correspondingly utilize the storage material on the upstream filter. In applications which have a more shallowly-running breakthrough signal through the coated filter, the downstream monolith must be designed to be correspondingly larger.

A further described advantage of the system layout according to the invention is that there is a resulting significantly more steeply running breakthrough signal downstream of the flow-through monolith. As a result of the steeper breakthrough signal of the medium to be stored as a result of the downstream connection of the coated monolith, regulation of the system is self-evidently made considerably easier (FIG. 2). Theories suggest that, in a coated wall-flow filter, the storage material which is present cannot be fully utilized because there are large pores in the wall of the wall-flow filter which have a greater permeability for exhaust gas than other points in the wall. At said points, the exhaust gas can pass through the wall more quickly, and the storage material arranged adjacent thereto is correspondingly filled more quickly than storage material which is localized at points of lower permeability on the support wall. A further explanation for this could be that, in a wall-flow filter, the storage material situated in the inlet duct on the side facing towards the exhaust gas is filled more quickly than the storage material situated further downstream in the ducts. In this way, a breakthrough of gases to be stored will occur close to the inlet of the filter even when the storage material situated deeper in the ducts has not yet been completely filled. This then ultimately leads to the blurring in the breakthrough signal. Said blurring is manifested in a shallower gradient of the concentration curve for the component to be stored (FIG. 2).

An additional aim achieved with the arrangement of a flow-through monolith with storage function downstream of a filter with the same storage function is therefore the ability to more easily diagnose the catalytic converters on account of the more steeply-running breakthrough signal of the component to be adsorbed downstream of the monolith. A continuously steeply-running breakthrough signal is obtained if the flow-through monolith connected downstream of the filter contains such an amount of storage material, or has a corresponding storage capacity, that the component to be stored which breaks through the filter is stored entirely on the monolith until the storage component on the filter is completely filled. In this case, the overall breakthrough signal is steeper downstream of the monolith than downstream of the filter. It may however also be desirable for the breakthrough signal downstream of the monolith to run more steeply than downstream of the filter only at the start of the breakthrough of the component to be stored, because a measure for emptying the storage material is often already initiated at an early time, for example if even a small breakthrough of the component to be stored is detected. In this case, even a small quantity of storage capacity on the downstream monolith is sufficient to provide a more steeply running breakthrough signal at least at the start of the breakthrough and at the time of the termination of the respective operating phase. In the case of ammonia or hydrogen sulphide as a medium to be stored, the target value will usually lie at a concentration of between 10 and 150 ppm in the exhaust gas. In the regulation of a system containing oxygen storage material, the target value will be a voltage of between 400 and 750 mV or a lambda value of between 0.98 and 1.02. A person skilled in the art will configure the storage capacities of the filter and of the downstream monolith according to the application.

All in all, it should be noted that, in addition to the ability to more easily diagnose the system, it is possible as a result of the use of the system layout to advantageously utilize the exhaust-gas aftertreatment system such that improved storage performance can be obtained using the same amount of storage materials, or in the reverse situation, similar storage performance can be achieved while saving on storage material or using cheaper storage materials which have poorer storage performance. Such advantageous effects were not at all obvious to a person skilled in the art on the basis of the information in the prior art at the time of the application.

It is normally more expedient for a person skilled in the art to arrange the coated monolith upstream of the filter in the flow direction, for example because the warm-up of a coated monolith usually takes place more quickly than the warm-up of a coated filter which usually has slower warm-up behaviour on account of the greater wall thickness, and therefore the purification function of the exhaust system is available more quickly after the cold start. Said arrangement is described for example in US20090193796.

Depending on the amount and degree of utilization of the storage medium on the filter, a certain amount of storage material may follow on the downstream monolith in order to be able to utilize the storage medium on the filter as completely as possible. It was not obvious to a person skilled in the art that a smaller quantity of storage material on the flow-through monolith arranged downstream is sufficient to obtain optimum utilization of the storage material on the wall-flow monolith. It is likewise possible with the system and method according to obtain advantageous regulability of exhaust systems on account of the resulting steeper signal profiles, if appropriate at the termination point. The associated advantages for the exhaust-gas purification system according to the invention are evident, and were not to be directly expected by a person skilled in the art on the basis of the teachings of the prior art.

FIGURES

FIG. 1 shows, by way of example, a system layout according to the invention with filter (1) upstream of a monolith (2).

FIG. 2 shows, by way of example, how the storage of oxygen on a wall-flow filter coated with oxygen storage material and on a flow-through monolith containing an oxygen storage material takes place. The figure shows in each case the breakthrough signal of oxygen downstream of the respective component as a quantity of oxygen downstream of the catalytic converter ($O_2$) divided by the measured quantity of oxygen upstream of the catalytic converter ($O_2$ in). In the present calculation, the same amount of oxygen storage material is present on the filter and on the monolith. The total quantity of stored oxygen, that is to say the storage capacity on both components, is the same. However, the oxygen breakthrough through the filter begins earlier (dashed line) than through the monolith (solid line), and the breakthrough curve downstream of the monolith runs considerably more steeply than downstream of the filter. In an exhaust-gas aftertreatment system operated under real conditions, the storage phase would be terminated when a minimum slippage of the component to be stored downstream of the catalytic converter is registered. It can be clearly seen that the storage across the monolith runs for longer—approximately 2.7 seconds until the breakthrough—in relation to approximately 2 seconds until the detection of the oxygen breakthrough downstream of the filter. The oxygen storage material on the monolith is therefore utilized more effectively than the oxygen storage material on the filter.

FIG. 3 shows an example in which the storage behaviour of oxygen ($O_2$) on an oxygen store takes place. In each case the same amount of oxygen storage material has been applied to a wall-flow filter and also to a flow-through monolith. The storage behaviour of the two components has been calculated with the filter arranged downstream of the monolith (dashed lines) and with the monolith arranged downstream of the filter (solid lines). It can be seen that the breakthrough signal of the system monolith+filter runs less steeply than the breakthrough signal of the system filter+monolith. In the system filter+monolith, 92.1% of the storage material is utilized before a breakthrough of the component to be stored occurs, while in the system monolith+filter, only 72.7% of the storage medium is utilized before the breakthrough. This means that, in the preferred application (filter+monolith), the downstream monolith utilizes 19.4% more storage material than the filter in the arrangement monolith+filter. For the same storage quantity in the system, therefore, 9.7% more storage material is utilized in the embodiment according to the invention, and the slippage of the compound to be stored (in this case oxygen) takes place with a significantly more steeply running signal, which considerably simplifies regulation and monitoring of the system, for example by means of an oxygen sensor arranged downstream.

FIG. 4 schematically shows the signal of oxygen downstream of a filter containing oxygen storage material (dashed line). Optimum utilization of the entire storage material on the filter takes place when a downstream monolith contains precisely such an amount of storage material that the breakthrough of the component to be stored downstream of said monolith occurs when the storage capacity of the storage material on the filter is 100% exhausted, as illustrated in the solid line in FIG. 4. After 4 seconds, there is a 100% breakthrough of the oxygen through the filter, while the slippage downstream of the monolith is only just beginning. In this example, the monolith contains approximately 40% of the storage quantity of the filter and can therefore better utilize already approximately 33% of the storage material in the filter. Here, the time until the breakthrough of oxygen is virtually doubled from 2 seconds to approximately 4 seconds. The earlier the breakthrough of a component to be stored takes place through the filter and the less the storage medium on the filter can be utilized, the higher the storage amount on the downstream monolith should be. For cost reasons, it is expedient for at least 70% of the storage medium on the filter to be utilized before the breakthrough through a downstream monolith takes place. In contrast, as already mentioned above, to utilize the improved diagnostic capability, even a small quantity of storage capacity on the downstream monolith may be sufficient in order to intercept only the start of the breakthrough through the filter in the monolith and to provide that the breakthrough signal rises more steeply at least at the start. It is thus evident to a person skilled in the art that it is sufficient for the storage capacity on component (2) to be configured such that the breakthrough signal has a relatively high gradient only up to a predefined target value which initiates a measure, because a higher storage capacity on component (2) will not further increase the gradient of the breakthrough signal at the point of the target value, but rather only the utilization of the storage material on the filter, and of the entire storage capacity of filter+monolith, is increased.

Description of the model for calculating the breakthrough curves of FIGS. 2 and 3:

The simulation model used solves the balance equation for the concentrations in a representative section comprising in each case one inlet and outlet duct and the wall between the two ducts. Such a model is described in detail in: Votsmeier, M.; Gieshoff, 3.; Kögel, M.; Pfeifer, M.; Knoth, J. F.; Drochner, A.; Vogel, H. Wall-flow filters with wall-integrated oxidation catalyst: A simulation study. Appl Catal B 2007, 70, 233.

The cited reference deals with catalytic reactions without storage effects. To depict storage effects in the wall (for example oxygen store), an additional balance equation for the component stored in the wall is solved. Because neither diffusion nor convection need be taken into consideration for the stored components, said balance equation simplifies to:

$$\frac{\partial C_{stored}}{\partial t} = r \quad (1)$$

Where r represents the reaction rate of the corresponding storage reaction. The same reaction rate also appears in the balance equation for the gaseous components in the filter wall:

$$0 = -\nabla \cdot (cu) + \nabla \cdot (D\nabla c) - r \quad (2)$$

To explain the remaining symbols in equation 2, see the reference cited above. The reaction rate is calculated in the given examples as:

$$r = k^* c_g^* (C_{MAX} - C_{stored}) \quad (3)$$

Where $c_g$ represents the dimensionless gas phase concentration, for example of oxygen in the gas phase, normalized with respect to the inlet concentration, $C_{stored}$ represents the concentration of stored component in the wall, $C_{MAX}$ the maximum storage capacity of the wall. $C_{stored}$ and $C_{MAX}$ are likewise dimensionless, and are specifically specified relative to the inlet concentration of the gas phase component.

The modelling of the flow-through monolith likewise takes place similarly to the above-cited publication. Again, the catalytic gas phase reaction dealt with in the publication is replaced with a storage reaction (corresponding to equations 1-2). The speed of the storage reaction is again calculated by means of equation 3.

The relevant parameters for the specified example are:
Spatial velocity: 37500 h-1
Temperature: 400° C.
For the wall-flow filter:
Cell density: 300 cpsi
Wall thickness: 0.33 mm
Diffusion coefficient in the wall: 1E-5 m²/s
k: 100 s$^{-1}$
$C_{MAX}$: 111
For the flow-through monolith:
Cell density: 400 cpsi
Wall thickness: 0.1 mm
Washcoat layer thickness: 60 µm
Diffusion coefficient in the washcoat: 3E-6 m²/s
k: 100 s$^{-1}$
$C_{MAX}$: 182

The invention claimed is:

1. Exhaust-gas aftertreatment system for internal combustion engines, having a wall-flow filter as component (1) and, downstream thereof, a flow-through monolith as component (2), with both components (1) and (2) having at least one storage function for the same compound, selected from the group consisting of $SO_x$, $NO_x$, $NH_3$, $O_2$, HC, and $H_2S$, which is present in the exhaust gas, wherein
the storage capacity in the component (2) is to be designed such that the breakthrough signal downstream of component (2) has the highest gradient of the concentration curve resulting at the respective termination criterion taken into consideration for the exhaust-gas compound while as little as possible of the storage material is used.

2. System according to claim 1, wherein
both component (1) and component (2) contain the same storage material.

3. System according to claim 1, wherein
both component (1) and component (2) have at least one catalytically active function.

4. System according to claim 1, wherein
component (1) and component (2) catalyse the same reactions.

5. A process for the production of the aftertreatment system according to claim 1, comprising
arranging the component (2) downstream of the component (1).

6. A method of purifying exhaust gases of an internal combustion engine comprising:
a) conducting exhaust gases across component (1) and subsequently across component (2) of the system in claim 1.

7. The method according to claim 6, further comprising:
b) measuring or modelling, downstream of the component (2), the concentration of a compound selected from the group consisting of $SO_x$, $NO_x$, $NH_3$, $O_2$, HC, and $H_2S$, which is present in the exhaust gas,; and
c) initiating measurement by an ECU when a stored target value is reached.

8. The method according to claim 7, wherein
the stored target value is a value for a parameter selected from the group consisting of concentration, mass flow, cumulative mass, air/fuel ratio, and lambda value.

* * * * *